(12) United States Patent
Kim et al.

(10) Patent No.: US 9,302,715 B2
(45) Date of Patent: Apr. 5, 2016

(54) VEHICLES HAVING SIDE SUPPORT REINFORCEMENT GUSSETS

(71) Applicants: Toyota Motor Engineering & Manufacturing North America Inc., Erlanger, KY (US); Toyota Jidosha Kabushiki Kaisha, Toyota-Shi, Aichi-ken (JP)

(72) Inventors: John P. Kim, Ann Arbor, MI (US); Jonathan R. Young, Saline, MI (US); Yuuichi Tsunoda, Toyota (JP)

(73) Assignees: Toyota Motor Engineering & Manufacturing North America, Inc., Erlanger, KY (US); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/481,947

(22) Filed: Sep. 10, 2014

(65) Prior Publication Data
US 2016/0068198 A1    Mar. 10, 2016

(51) Int. Cl.
*B62D 25/02* (2006.01)
*B62D 25/20* (2006.01)
*B62D 27/02* (2006.01)

(52) U.S. Cl.
CPC .......... *B62D 27/023* (2013.01); *B62D 25/2036* (2013.01)

(58) Field of Classification Search
CPC ...... B62D 25/02; B62D 25/025; B62D 25/20; B62D 25/2009; B62D 25/2018; B62D 25/2036
USPC .............. 296/187.08, 187.1, 187.12, 193.02, 296/193.05, 193.09, 203.01–203.03, 29, 30, 296/209
See application file for complete search history.

(56) References Cited

U.S. PATENT DOCUMENTS

| 4,450,926 | A  | * | 5/1984  | Suzuki ........................ 180/312 |
| 5,352,011 | A  | * | 10/1994 | Kihara et al. ............ 296/203.03 |
| 6,338,510 | B1 | * | 1/2002  | Kanamori et al. ............ 293/154 |
| 6,416,117 | B1 | * | 7/2002  | Weiman ........................ 296/204 |
| 6,568,745 | B2 | * | 5/2003  | Kosuge et al. ............ 296/193.02 |
| 7,644,978 | B2 |   | 1/2010  | Tosaka et al. |
| 7,841,649 | B2 |   | 11/2010 | Konishi et al. |
| 8,292,356 | B2 | * | 10/2012 | Ishigame et al. ......... 296/203.01 |
| 8,567,857 | B2 | * | 10/2013 | Fujii et al. ..................... 296/204 |
| 8,646,833 | B2 |   | 2/2014  | Fujii et al. |
| 8,672,383 | B2 | * | 3/2014  | Crane et al. ..................... 296/29 |
| 2006/0055209 | A1 | * | 3/2006 | Hoshino .................. 296/203.03 |
| 2007/0063543 | A1 | * | 3/2007 | Roccato et al. .......... 296/187.08 |
| 2007/0284914 | A1 |   | 12/2007 | Schiebel et al. |
| 2010/0237659 | A1 | * | 9/2010 | Ishigame et al. .............. 296/204 |
| 2012/0126582 | A1 | * | 5/2012 | Kishi ....................... 296/203.01 |
| 2013/0214559 | A1 | * | 8/2013 | Vantrease et al. ........ 296/187.12 |
| 2013/0257097 | A1 | * | 10/2013 | Kojo et al. ............... 296/187.08 |
| 2013/0270863 | A1 |   | 10/2013 | Young et al. |
| 2014/0091585 | A1 | * | 4/2014 | Ramoutar et al. ............ 293/133 |
| 2015/0069778 | A1 | * | 3/2015 | Torii .............................. 296/29 |

* cited by examiner

*Primary Examiner* — Gregory Blankenship
(74) *Attorney, Agent, or Firm* — Dinsmore & Shohl LLP

(57) ABSTRACT

A vehicle including a side support extending in a vehicle longitudinal direction, a cross member extending transverse to the side support, and a reinforcement gusset coupled to the side support and the cross member, where the cross member and the reinforcement gusset define an interrupted interface in which one of the cross member or the reinforcement gusset includes a recessed portion and the opposite of the cross member or the reinforcement gusset includes an extended portion, and the recessed portion and the extended portion have complementary shapes and are detached from one another.

20 Claims, 12 Drawing Sheets

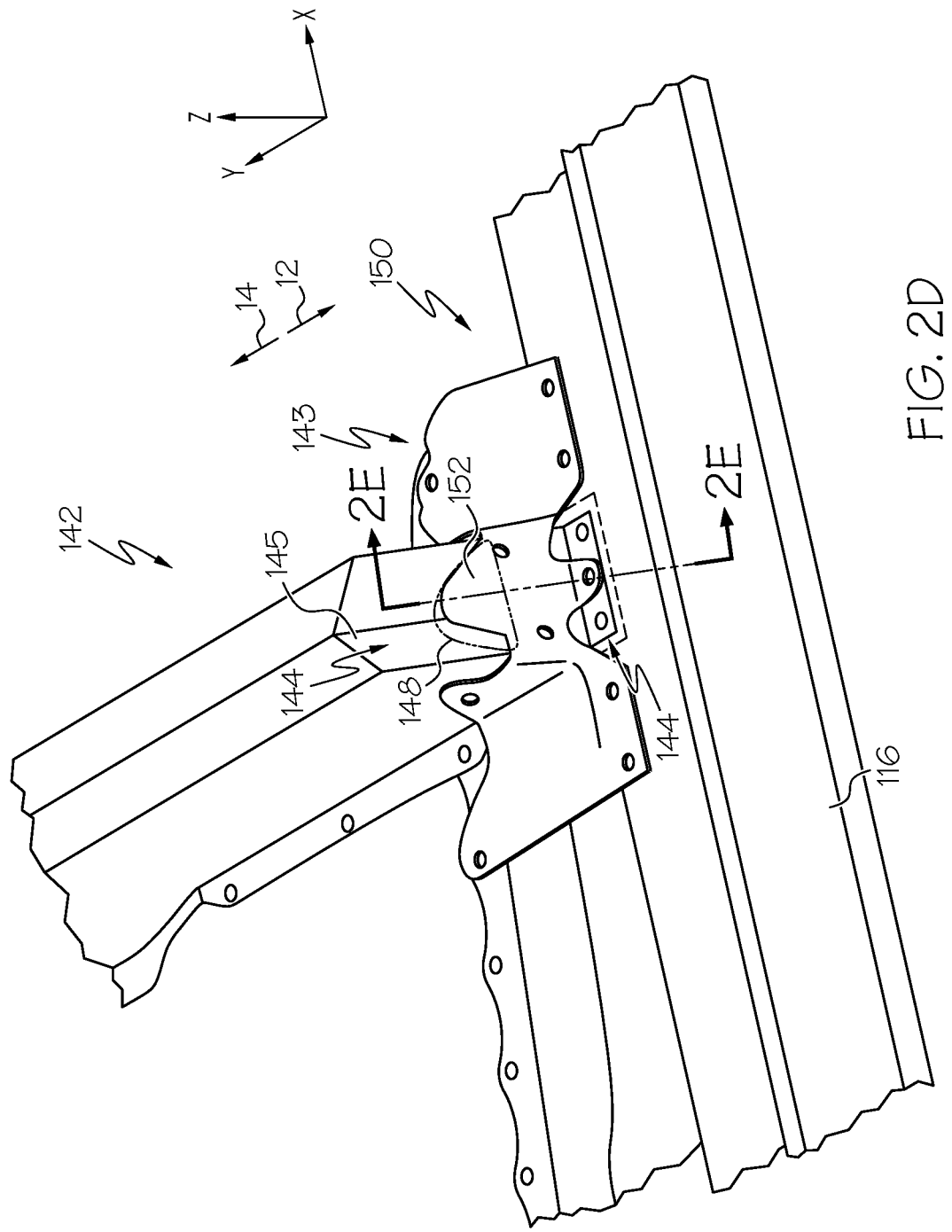

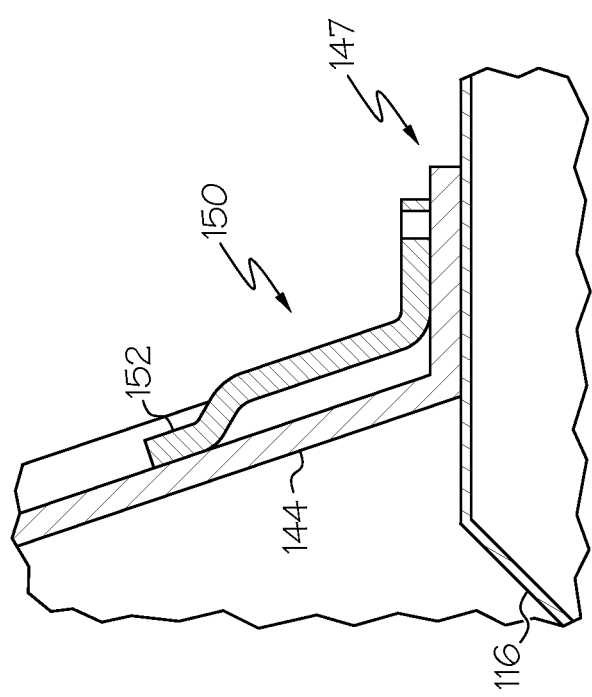

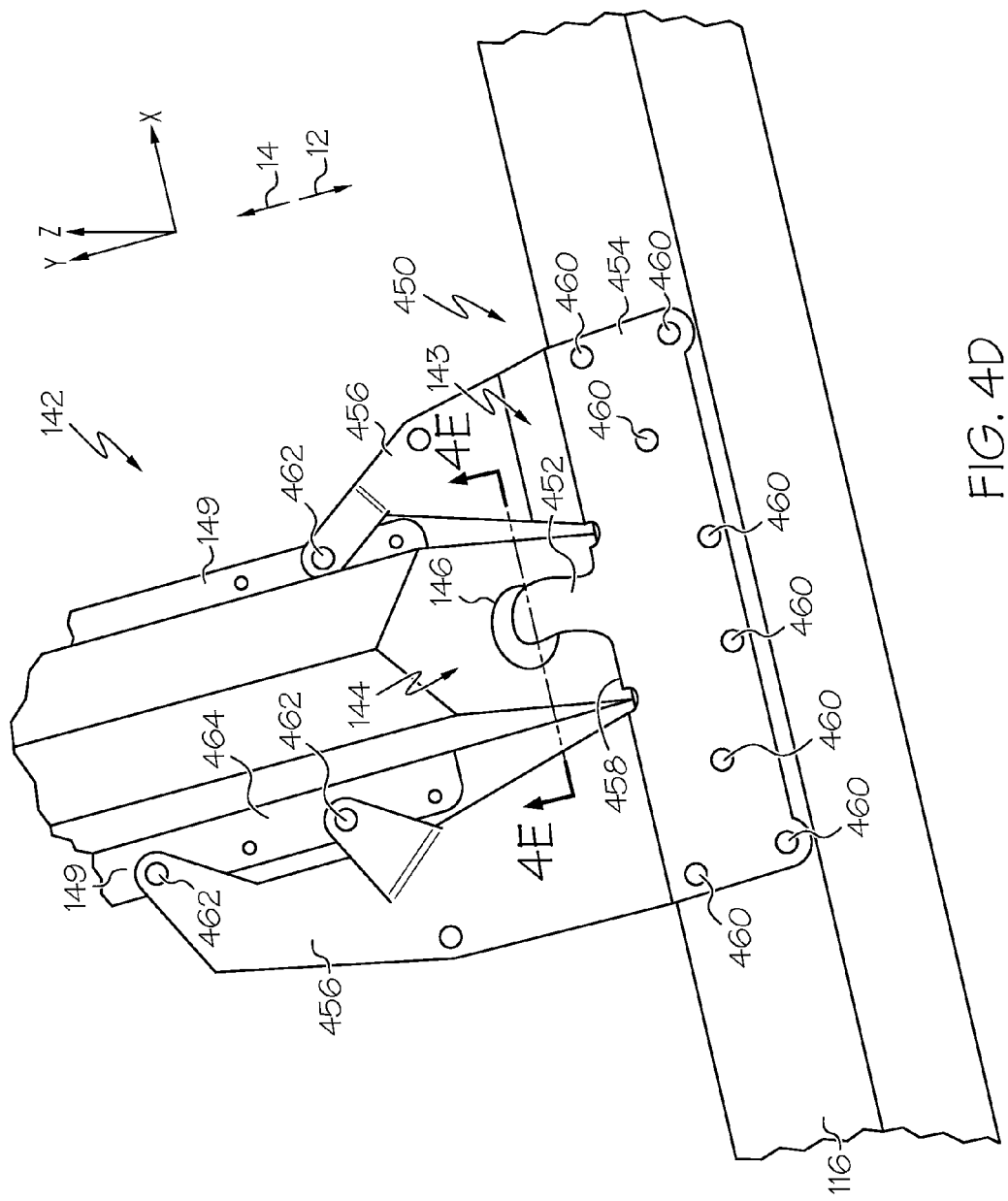
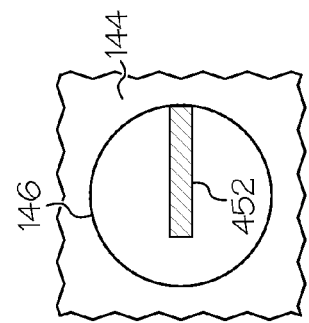
FIG. 4D
FIG. 4E

VEHICLES HAVING SIDE SUPPORT REINFORCEMENT GUSSETS

TECHNICAL FIELD

The present specification generally relates to vehicles including structures for transferring and absorbing energy in the event of an impact and, more specifically, to vehicles including a side support reinforcement gusset.

BACKGROUND

Vehicles may be equipped with bumper systems and crash protection structures that plastically deform to absorb energy in the event of a crash. When a vehicle impacts or is impacted by an object that is offset from the centerline of the vehicle such that the object overlaps a portion of the bumper, the ability of the energy absorbing structure of the vehicle to absorb energy associated with the impact may be reduced. In some impact configurations, the energy absorbing structure of the vehicle may not be activated or may only be partially activated because the object does not come into contact with or only partially comes into contact with associated bumper or vehicle structure. Therefore, the bumper and the energy absorbing structure of the vehicle may have a reduced effect on the dissipation of the energy of the impact. Instead, the energy from the impact may be directed into various vehicle structures, including units of the vehicle.

In one example, a substantial portion of energy from an impact with a small front bumper overlap may be directed into a front wheel assembly, which causes the front wheel assembly to be directed in a generally rearward direction. The energy may be transferred rearwardly along the vehicle towards the vehicle structure as the front wheel assembly contacts vehicle structures proximate to a passenger cabin of the vehicle.

Accordingly, a need exists for alternative structures for transferring energy and absorbing energy from a small front bumper overlap collision.

SUMMARY

In one embodiment, a vehicle includes a side support extending in a vehicle longitudinal direction, a cross member extending transverse to the side support, and a reinforcement gusset coupled to the side support and the cross member. The cross member and the reinforcement gusset define an interrupted interface in which one of the cross member or the reinforcement gusset comprises a recessed portion and the opposite of the cross member or the reinforcement gusset comprises an extended portion, and the recessed portion and the extended portion have complementary shapes and are detached from one another.

In another embodiment, a vehicle includes a side support extending in a vehicle longitudinal direction, a cross member extending transverse to the side support and positioned proximate to the side support at an interface joint, and a reinforcement gusset coupled to the side support and the cross member. The reinforcement gusset is coupled to the side support at an outboard securement position in a vehicle lateral direction from the interface joint, and the reinforcement gusset is coupled to the cross member at an inboard securement position in the vehicle lateral direction from the interface joint.

In yet another embodiment, a method of resisting separation of a cross member and a side support during a vehicle collision includes striking a front of a vehicle against an object, translating a front suspension unit of the vehicle in a rearward vehicle longitudinal direction, and striking the front suspension unit against a side support of the vehicle. The method also includes translating the side support of the vehicle in the rearward vehicle longitudinal direction and resisting separation of the cross member from the side support with a reinforcement gusset coupled to the side support and the cross member. The cross member and the reinforcement gusset define an interrupted interface in which one of the cross member or the reinforcement gusset comprises a recessed portion and the opposite of the cross member or the reinforcement gusset comprises an extended portion, and the recessed portion and the extended portion have complementary shapes and are detached from one another.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2D schematically depicts a perspective view of vehicle structural members having a reinforcement gusset that couples a side support to a cross member with the vehicle structural members under deformation according to one or more of the embodiments shown or described herein;

FIG. 2E schematically depicts a sectional view of vehicle structural members having a reinforcement gusset that couples a side support to a cross member with the vehicle structural members under deformation along section 2E-2E depicted in FIG. 2D according to one or more of the embodiments shown or described herein;

FIG. 4D schematically depicts a perspective view of vehicle structural members having a reinforcement gusset that couples a side support to a cross member with the vehicle structural members under deformation according to one or more of the embodiments shown or described herein; and FIG. 4E schematically depicts a sectional view of vehicle structural members having a reinforcement gusset that couples a side support to a cross member with the vehicle structural members under deformation along section 4E-4E depicted in FIG. 4D according to one or more of the embodiments shown or described herein.

DETAILED DESCRIPTION

Vehicles according to the present disclosure may include a side support that extends in a vehicle longitudinal direction, a cross member that extends transverse to the side support and is coupled to the side support with a reinforcement gusset. The cross member and the reinforcement gusset define an interrupted interface in which one of the cross member or the reinforcement gusset include a recessed portion and the opposite of the cross member or the reinforcement gusset include an extended portion, where the recessed portion and the extended portion have complementary shapes. The recessed portion and the extended portion are detached from one another. In the event of an impact that introduces energy to the side support, the extended portion may be directed into contact with the recessed portion, such that the energy of an impact may be transferred from the side support into the cross member. Transferring energy of an impact away from the side support and into the cross member may maintain structural integrity of the passenger cabin of the vehicle, and, for certain vehicle constructions, may prevent the vehicle body from separating from the vehicle frame. These and other embodiments will be described in more detail below in reference to the appended drawings.

Figure 1:
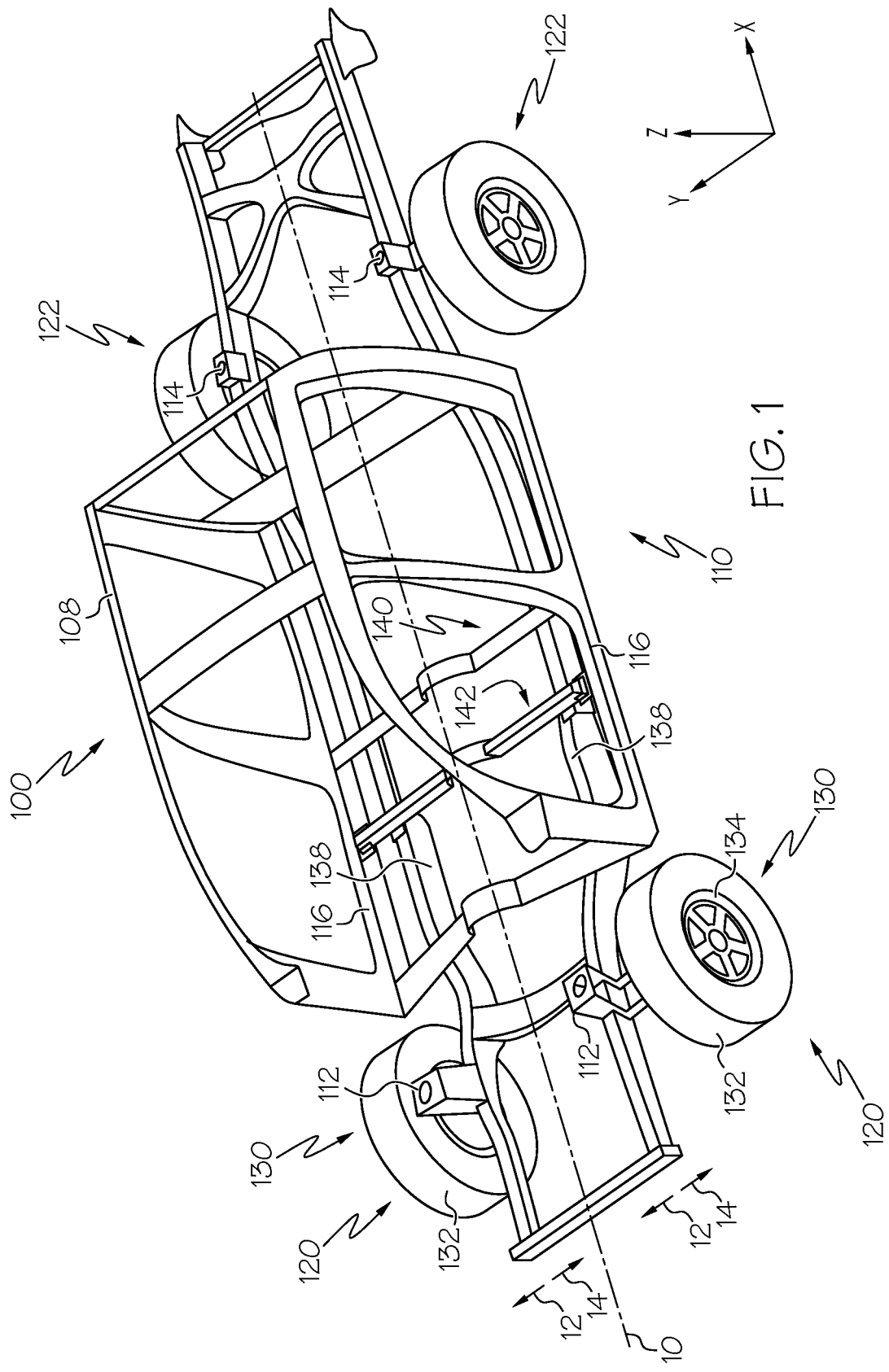
FIG. 1 schematically depicts a perspective view of vehicle structural members according to one or more of the embodiments shown or described herein.

Referring to FIG. 1, a vehicle 100 is depicted with certain body panels removed for clarity. The vehicle 100 includes a frame 110. The frame 110 may include a plurality of frame rails 138 that are positioned to extend along the vehicle 100 and generally extend in a vehicle longitudinal direction. The frame 110 includes a pair of front suspension mounts 112 and a pair of rear suspension mounts 114. The front suspension mounts 112 and the rear suspension mounts 114 may be coupled to the frame rails 138. The vehicle 100 also includes a cabin 108 that is coupled to the frame 110 in a body-on-frame construction methodology. The cabin 108 generally defines a passenger cabin of the vehicle 100.

As used herein, the term "vehicle longitudinal direction" refers to the forward-rearward direction of the vehicle, which corresponds to the direction between the front suspension units 120 and the rear suspension units 122. The term "vehicle lateral direction" refers to the cross-vehicle direction of the vehicle, and is generally perpendicular to the vehicle longitudinal direction. Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10, and the term "inboard" as used herein refers to the relative location of a component in direction 14 with respect to the vehicle centerline 10. Because the vehicle may be generally symmetrical about the vehicle centerline 10, the use of terms "inboard" and "outboard" may be switched when evaluating components positioned along opposite sides of the vehicle 100.

Motor vehicles according to the present disclosure may include a variety of construction methodologies that are conventionally known, including the body-on-frame construction methodology depicted in FIG. 1 as well as unibody construction methodology. While the embodiments of the present disclosure are described and depicted herein in reference to body-on-frame structures, it should be understood that vehicles that are constructed with unibody construction may incorporate the elements that are recited herein.

Referring again to FIG. 1, the frame 110 of the vehicle 100 includes a pair of opposing side supports 116 that are spaced apart from one another. The pair of opposing side supports 116 may extend in a vehicle longitudinal direction. In embodiments, the pair of opposing side supports 116 may extend between front wheel arches and rear wheel arches (not shown) of the vehicle body. In other embodiments, the pair of opposing side supports 116 may not fully extend between the front wheel arches and the rear wheel arches (not shown) and may terminate before the front wheel arches and/or the rear wheel arches. The front wheel arches and the rear wheels arches are positioned relative to the front suspension mounts 112 and the rear suspension mounts 114, respectively, as conventionally known. The opposing side supports 116 are maintained in position relative to one another with cross-frame supports. Front suspension units 120 are coupled to the front suspension mounts 112 and rear suspension units 122 coupled to the rear suspension mounts 114 of the frame 110.

Additionally, embodiments according to the present disclosure are generally described with respect to body-on-frame vehicle construction techniques. With such vehicle structures, the side supports 116 may also be referred to as rockers or side sills of the cabin 108. However, attachment schemes according to the present disclosure may also be incorporated into vehicles having unibody construction. With such unibody vehicle structures, the side supports may be analogous to the rockers or side sills that are positioned proximate to the door openings of the vehicle structure and positioned between the front wheel well and the rear wheel well of the vehicle. Alternatively, side supports may be analogous to side members that extend between front suspension mounts and the rear suspension mounts.

Referring again to FIG. 1, a pair of front suspension units 120 may be coupled to the front suspension mounts 112. As used herein, the front suspension units 120 may generally include vehicle components that connect the frame 110 to a tire 132. These components may include control arms (not depicted), steering links (not depicted), and a front chassis member (not depicted) including a spring (not depicted) and a strut (not depicted). The spring (not depicted) and the strut (not depicted) may be coupled to a knuckle assembly (not depicted) including a hub (not depicted). A wheel assembly 130 may be coupled to the hub (not depicted). The wheel assembly 130 may have a tire 132 that is positioned to surround a wheel 134.

The cabin 108 includes a pair of side supports 116 that are spaced apart from one another in the vehicle lateral direction, as depicted in FIG. 1. The side supports 116 extend in a vehicle longitudinal direction (i.e., in the +/−vehicle X-direction depicted in FIG. 1), and extend between the front wheel arch and the rear wheel arch of the vehicle 100. The side supports 116 are positioned rearward of the wheel assemblies 130 and the tire 132 of the front suspension units 120 in the vehicle longitudinal direction. In vehicle embodiments exhibiting body-on-frame construction, the side supports 116 may be coupled to the frame 110 through the attachment of the cabin 108 to the frame. In other vehicle embodiments exhibiting unibody construction (not shown), the side supports may be integral to the vehicle support structure, such that the side supports are incorporated into a pair of side sills that are incorporated into the cabin 108.

Still referring to FIG. 1, the cabin 108 is a separate structure from the frame 110 and is attached to the frame 110 of the vehicle 100. The cabin 108 includes the side supports 116 that extend in the longitudinal vehicle direction, and are generally parallel to the frame rails 138 of the frame 110. The side supports 116 are positioned proximate to lower portion of the door opening of the cabin 108. The side supports 116 may also be positioned proximate to the floor 140 of the cabin 108. A plurality of structural elements of the cabin 108 may be coupled to the side supports 116. The cabin 108 may include at least one cross member 142 that extends between the side supports 116 and at least partially defines the floor 140 of the cabin 108. The cross member 142 extends between the side supports 116 in a vehicle lateral direction (i.e., in the +/−vehicle Y-direction depicted in FIG. 1). In vehicles 100 according to the present disclosure, passenger seats (not depicted) may be coupled to the floor 140 of the cabin 108 at positions generally proximate to the cross member 142. In some embodiments, the passenger seats (not depicted) may be coupled to the cross member 142.

Figure 2A:
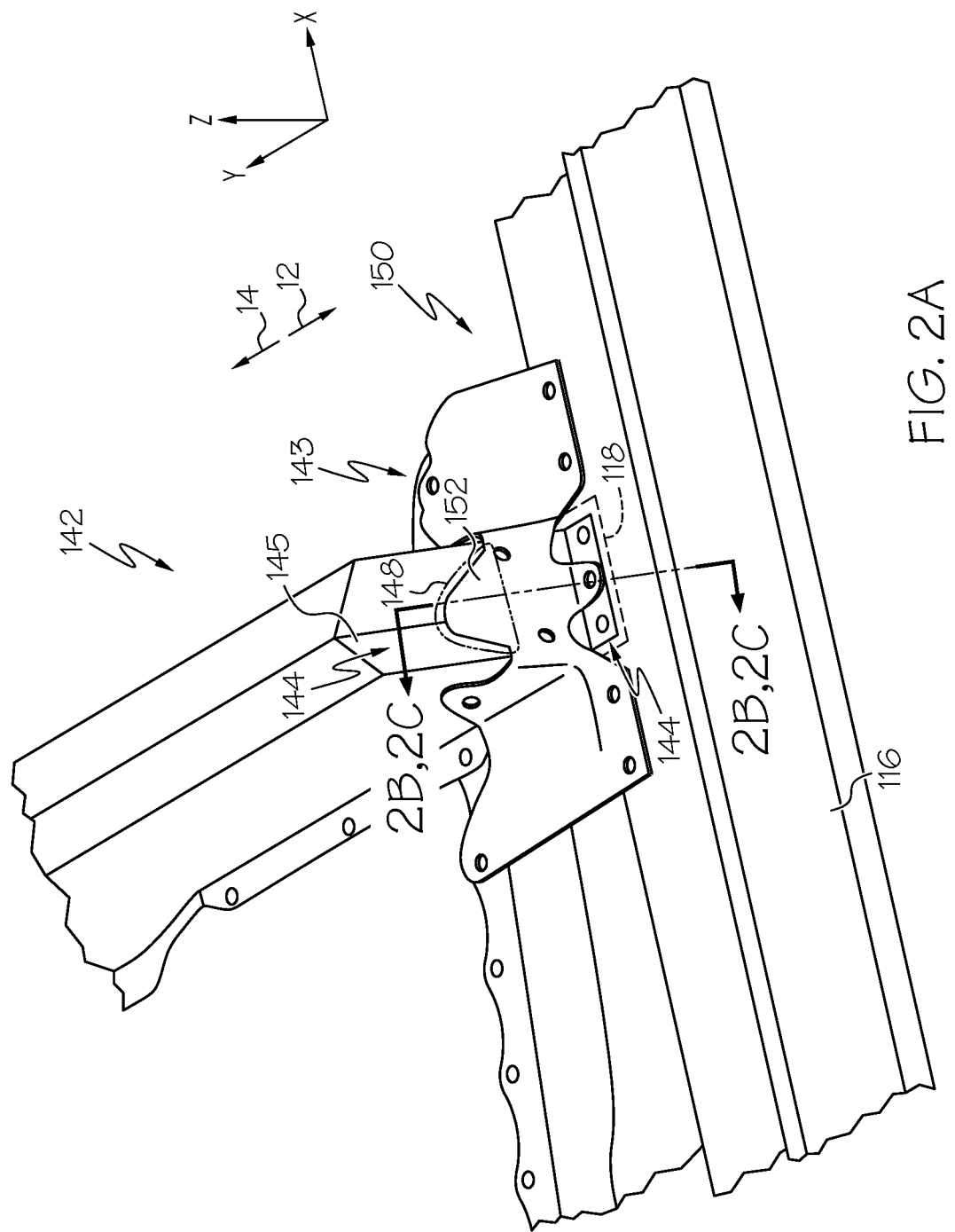
FIG. 2A schematically depicts a perspective view of vehicle structural members having a reinforcement gusset that couples a side support to a cross member according to one or more of the embodiments shown or described herein.

Referring now to FIG. 2A, the cross member 142 may extend to an interface portion 143 positioned proximate to the ends of the cross member 142. The interface portion 143 of the cross member 142 may be coupled to the side supports 116 to reinforce the cabin 108. In the embodiment depicted in FIG. 2A, the interface portion 143 includes a recessed portion 144 that extends inboard into the cross member 142 (i.e., in the +Y-direction depicted in FIG. 2A). The recessed portion 144 may include a recessed face that is offset in an inboard direction from an outer face of the interface portion 143 of the cross member 142. In the depicted embodiment, the recessed portion 144 includes a depression 145 that extends inboard into the cross member 142. In other embodiments (not shown), the interface portion 143 may include a taper that defines the recessed portion 144. In yet other embodiments (not shown), the cross member 142 may include an extended portion that extends outboard from the cross member 142.

Figure 2B:
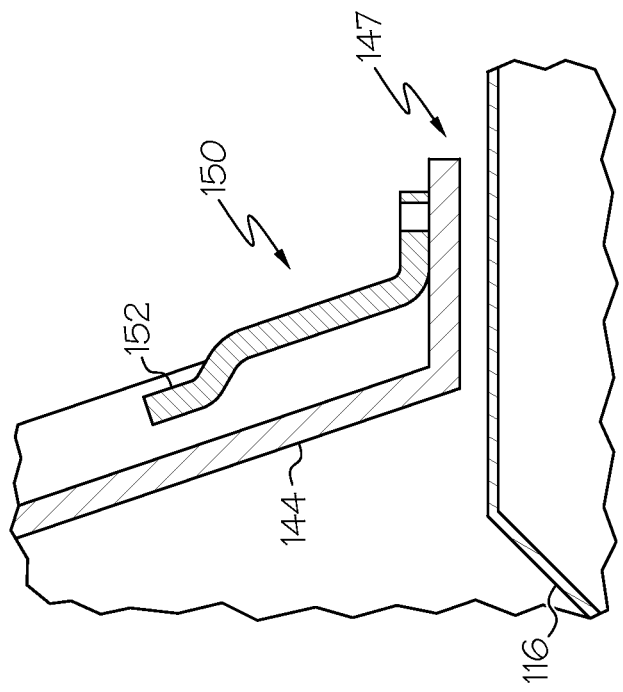
FIG. 2B schematically depicts a sectional view of vehicle structural members having a reinforcement gusset that couples a side support to a cross member along section 2B-2B depicted in FIG. 2A according to one or more of the embodiments shown or described herein.
Figure 2C:
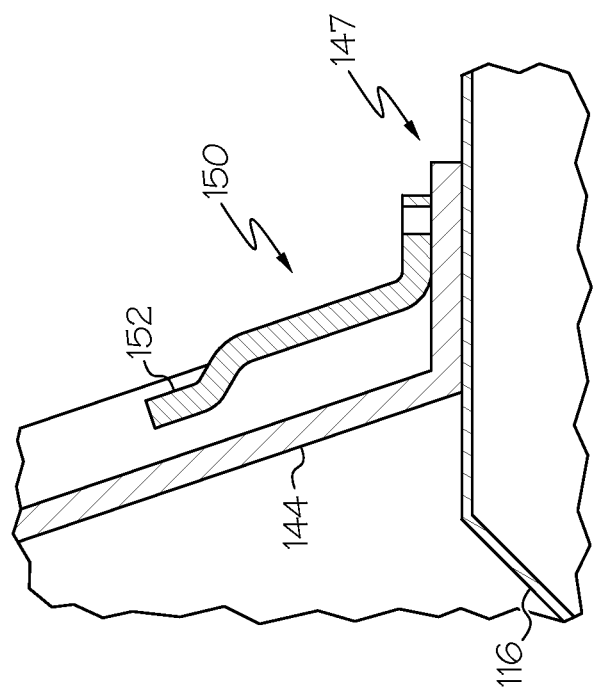
FIG. 2C schematically depicts a sectional view of vehicle structural members having a reinforcement gusset that couples a side support to a cross member along section 2C-2C depicted in FIG. 2A according to one or more of the embodiments shown or described herein.

In embodiments according to the present disclosure, the cross member 142 is coupled to the side support 116 at a securement interface 118 with a reinforcement gusset 150, as depicted in FIG. 2A. In some embodiments, the cross member 142 is directly coupled to the side support 116 at the securement interface 118, as depicted in FIG. 2B. In other embodiments, the cross member 142 may be detached from the side support and the cross member 142 may be coupled to the side support 116 solely through the reinforcement gusset 150, as depicted in FIG. 2C. The cross member 142 may be coupled to the side support 116 through a variety of joining techniques including, for example and without limitation, mechanical fasteners, spot welds, weld joints, structural adhesives, brazes, shear pins, and the like.

Referring to FIG. 2A, a reinforcement gusset 150 may be coupled to the cross member 142 and at least one of the side supports 116. The reinforcement gusset 150 may be coupled to the cross member 142 through a variety of joining techniques including for example and without limitation, mechanical fasteners, spot welds, weld joints, structural adhesives, brazes, shear pins, and the like. The reinforcement gusset 150 may be formed from a variety of materials including, for example and without limitation, metals, composites, and the like.

Referring to FIGS. 2A, 2B, and 2C, the reinforcement gusset 150 is positioned proximate to the cross member 142 and the side support 116, such that the reinforcement gusset 150 and the cross member 142 form an interrupted interface 148 between the cross member 142 and the reinforcement gusset 150. At the interrupted interface 148, the side support 116 and the cross member 142 are positioned to be proximate to one another. However, the side support 116 and the cross member 142 are detached from one another at positions proximate to the interrupted interface 148. Referring to FIG. 2B, the cross member 142 may include a flange 147 positioned between the side support 116 and the reinforcement gusset 150.

In embodiments according to the present disclosure, the reinforcement gusset 150 may include an extended portion 152 that is positioned proximate to the cross member 142. As depicted in FIGS. 2A, 2B, and 2C the extended portion 152 has a shape that is complementary to the recessed portion 144 of the cross member 142, such that the shape of the extended portion 152 corresponds to the shape of the recessed portion 144 of the cross member 142. In one embodiment, the extended portion 152 may have a generally wedged shape, while the recessed portion 144 may have a chevron shape that generally corresponds to the wedged shape of the extended portion 152. Under normal operating conditions, the reinforcement gusset 150 maintains the relative positioning of the cross member 142 such that the extended portion 152 of the reinforcement gusset 150 is spaced apart from the recessed portion 144 of the cross member 142, as shown in FIGS. 2B and 2C. As will be discussed in further detail below, in the event of a vehicle collision, the side support 116 of the cabin 108 may deflect inwards towards the cross member 142, deforming the reinforcement gusset 150 such that the recessed portion 144 of the cross member 142 comes into contact with the extended portion 152 of the reinforcement gusset 150. Through contact between the recessed portion 144 and the extended portion 152, energy associated with the collision may be transferred from the side support 116 through the now-contacting interface between the reinforcement gusset 150 and the cross member 142. In some impact configurations, side support 116 of the vehicle may introduce an inboard force to the cross member 142, which tends to load the cross member 142 in compression. The cross member 142 may have a tendency to buckle because of this force. Associated with this deformation mode, the cross member 142 may pivot relative the side support 116 about the vehicle longitudinal direction. Because the recessed portion 144 and the extended portion 152 have corresponding shapes, the cross member 142 may have some relative freedom in the vehicle vertical direction. However, the corresponding shapes of the recessed portion 144 and the extended portion 152 that form the securement interface 118 may accommodate deformation modes that include pivoting of the cross member 142 relative to the side support 116, as will be described in more detail below.

In an alternative embodiment (not depicted), the reinforcement gusset may include a recessed portion that extends outward from the cross member. In embodiments in which the reinforcement gusset includes a recessed portion, the cross member includes an extended portion having a shape that is complementary to the recessed portion of the reinforcement gusset.

When a vehicle is involved in a collision, vehicle structures may elastically and plastically deform while the vehicle slows from its previous operating speed. The collision diverts the energy associated with the moving vehicle into energy that deforms the vehicle structures. The vehicle structures may be designed to accommodate such collision events, such that the energy associated with the collision may be controllably dissipated through selective and preferential deformation of the vehicle structures.

When a vehicle is involved in a small overlap collision, for example when only a portion of the front bumper contacts a barrier, some of the energy dissipation elements of the vehicle structure may not be initiated. Instead, in small overlap collisions, the energy that is introduced to the vehicle structures may be non-symmetrical across the vehicle width. Accordingly, the response of the vehicle structures to the energy introduced by the small overlap collisions may induce a non-symmetrical response to the vehicle structures. Referring to embodiments disclosed herein that are incorporated into vehicles that have a body-on-frame structure, the structural members of the frame, for example, may be non-symmetrically loaded when the vehicle is involved in a small overlap collision. The non-symmetrical loading may induce the contacting side support 116 to deflect rearwardly relative to the non-contacting side support 116. The difference in deflection between the contacting and non-contacting side supports 116 may lead to shifting of the frame 110 that may be evaluated as a decrease in the dimension between the contacting and non-contacting side supports 116 when evaluated in the vehicle lateral direction.

Referring to FIGS. 1 and 2A-2E, when a vehicle strikes or is struck by an object with a front corner of the vehicle, the structures of the vehicle plastically deform to absorb the energy of the impact. The front corner of the vehicle may strike or be struck by an object in what is referred to herein as a small front bumper overlap or a small offset. In a small front bumper overlap collision, the collision occurs at an outward side of the vehicle in a vehicle lateral direction, and only a small portion of the front bumper strikes or is struck by the object.

Because only a small portion of the front bumper strikes or is struck by an object during a small front bumper overlap collision, energy absorbing structures associated with the front bumper may have a reduced effect on the dissipation of energy of the impact. Instead, the energy from the impact may be directed into the front suspension units of the vehicle.

As noted hereinabove, when a vehicle undergoes a small front bumper overlap collision, some of the energy absorbing structure associated with the front bumper of the vehicle may not be activated or may be partially activated, such that a portion of the energy absorbing structure of the vehicle may not dissipate energy associated with the small front bumper overlap collision. Instead, the energy of the impact may be directed into the front suspension unit 120 that are positioned proximate to the barrier that the vehicle impacts. Referring to FIG. 1, the energy of the collision is directed into the front suspension unit 120. This energy that is directed into the front suspension unit 120 may be directed into the wheel assembly 130, and may be directed in a generally rearward vehicle longitudinal direction (i.e., in the +X-direction depicted in FIG. 1). The wheel assembly 130 may continue to be directed rearward until the wheel assembly 130 impacts the side support 116 that is positioned proximate to the wheel assembly 130. The wheel assembly 130 may impact the side support 116 and transfer the energy associated with the collision into the side support 116. This transferred energy from the wheel assembly 130 to the side support 116 may cause the side support 116 to deform. The side support 116 may buckle in a rearward collapsing mode. The transferred energy may also cause the side support 116 to translate in a generally rearward direction. As the side support 116 deforms and/or translates in the generally rearward direction, the translation and deformation of the side support 116 may introduce stresses into the securement interface 118 between the cross member 142 and the side support 116.

Additionally, the transferred energy from the wheel assembly 130 is directed rearward, the cross member 142 may be loaded in compression, which may induce the cross member 142 to buckle. Such a deformation mode may cause the cross member to pivot relative to the side support 116 about the vehicle longitudinal direction. The transferred energy may cause the cross member 142 to pivot about the side support 116 which may introduce stress into the securement interface 118 between the cross member 142 and the side support 116.

As discussed hereinabove and referring to FIGS. 2D and 2E, the side support 116 and the cross member 142 are each coupled to the reinforcement gusset 150. As the side support 116 deforms and/or translates in the rearward direction, the side support 116 may introduce forces to the reinforcement gusset 150 in the rearward direction. The forces that are introduced to the reinforcement gusset 150 may tend to translate the reinforcement gusset 150 in the rearward direction relative to the cross member 142. As the reinforcement gusset 150 translates in the rearward direction, the extended portion 152 of the reinforcement gusset 150 may contact and engage the recessed portion 144 of the cross member 142, as depicted in FIG. 2E. The engagement between the extended portion 152 of the reinforcement gusset 150 and the recessed portion 144 of the cross member 142 may provide a mechanical interference between the reinforcement gusset 150 and the cross member 142. The mechanical interference between the reinforcement gusset 150 and the cross member 142 may allow for energy to be transferred from the side support 116 into the cross member 142.

As discussed hereinabove, the extended portion 152 of the reinforcement gusset 150 may be detached and spaced apart from the recessed portion 144 of the cross member 142. Because the extended portion 152 is detached and spaced apart from the recessed portion 144, the interface may additionally provide some relative freedom of movement between the side support 116 and the cross member 142. By providing the side support 116 and the cross member 142 some relative freedom of movement, the reinforcement gusset 150 may assist in preventing the cross member 142 from separating from the side support 116 as the side support 116 deforms and/or translates following a collision.

Vehicle structures incorporating interfaces according to the present disclosure may allow the side support 116 and the cross member 142 to become engaged with one another upon a vehicle collision, such that energy associated with the collision may be transferred into the vehicle structure. Vehicle structures incorporating interfaces according to the present disclosure may direct the energy of the impact across a dimensionally large interface, such that the energy can be effectively transferred from the side support 116 to the cross member 142. Vehicle structures that incorporate an interface according to the present disclosure may reduce the requirements of energy transfer across joining elements, that couple the side support 116 to the cross member 142 and would otherwise transfer the energy associated with the collision. Vehicle structures incorporating interfaces according to the present disclosure may direct the energy of the impact across a dimensionally large interface, such that the energy can be effectively transferred from the side support 116 to the cross member 142.

Further, vehicle structures that incorporate interfaces according to the present disclosure may exhibit reduced stiffness in the vehicle vertical direction. As discussed hereinabove, when the side support 116 and subsequently the reinforcement gusset 150 translate in a rearward and/or inboard direction, the extended portion 152 of the reinforcement gusset 150 may engage the recessed portion 144 of the cross member 142. As described above, the engagement and contact between the extended portion 152 and the recessed portion 144 may provide a mechanical interference. The mechanical interference between the extended portion 152 and the recessed portion 144 may exhibit stiffness in the vehicle longitudinal direction at the securement interface 118.

However, as described above, the extended portion 152 of the reinforcement gusset 150 has a corresponding shape with the recessed portion 144. Because the extended portion 152 has a corresponding shape with the recessed portion 144, the cross member 142 and the reinforcement gusset 150 have some freedom of movement with respect to one another without creating a mechanical interference in the vehicle vertical direction (i.e., in the +/−Z-direction depicted in FIG. 2A). As the cross member 142 and the reinforcement gusset 150 may move with respect to one another in the vehicle vertical direction, the securement interface 118 may exhibit a lower stiffness in the vehicle vertical direction than the vehicle longitudinal direction. Because the reinforcement gusset 150 may have lower stiffness in the vehicle vertical direction than in the vehicle longitudinal direction and the vehicle lateral direction. By allowing the interface between the side support 116 and the cross member 142 to have a decreased stiffness, the reinforcement gusset 150 may allow the side support 116 and the cross member 142 to move in the vehicle vertical direction relative to one another subsequent to a vehicle collision. By providing the side support 116 and the cross member 142 with elements that accommodate freedom of movement relative to one another, the reinforcement gusset 150 may assist in preventing the cross member 142 from separating from the side support 116 as the side support 116 deforms and/or translates following a collision. Such accommodation of freedom of movement may mitigate stresses that are generated across the securement interface 118 during and subsequent to the vehicle collision. However, the reinforcement gusset 150 may maintain sufficient positioning between the side support 116 and the cross member 142 to activate the securement interface 118 between the side support 116 and the cross member 142. The reinforcement gusset 150, therefore, may accommodate the relative translation and/or deformation between the side support 116 and the cross member 142 while maintaining the ability to transfer energy from the side support 116 to the cross member 142.

Figure 3A:
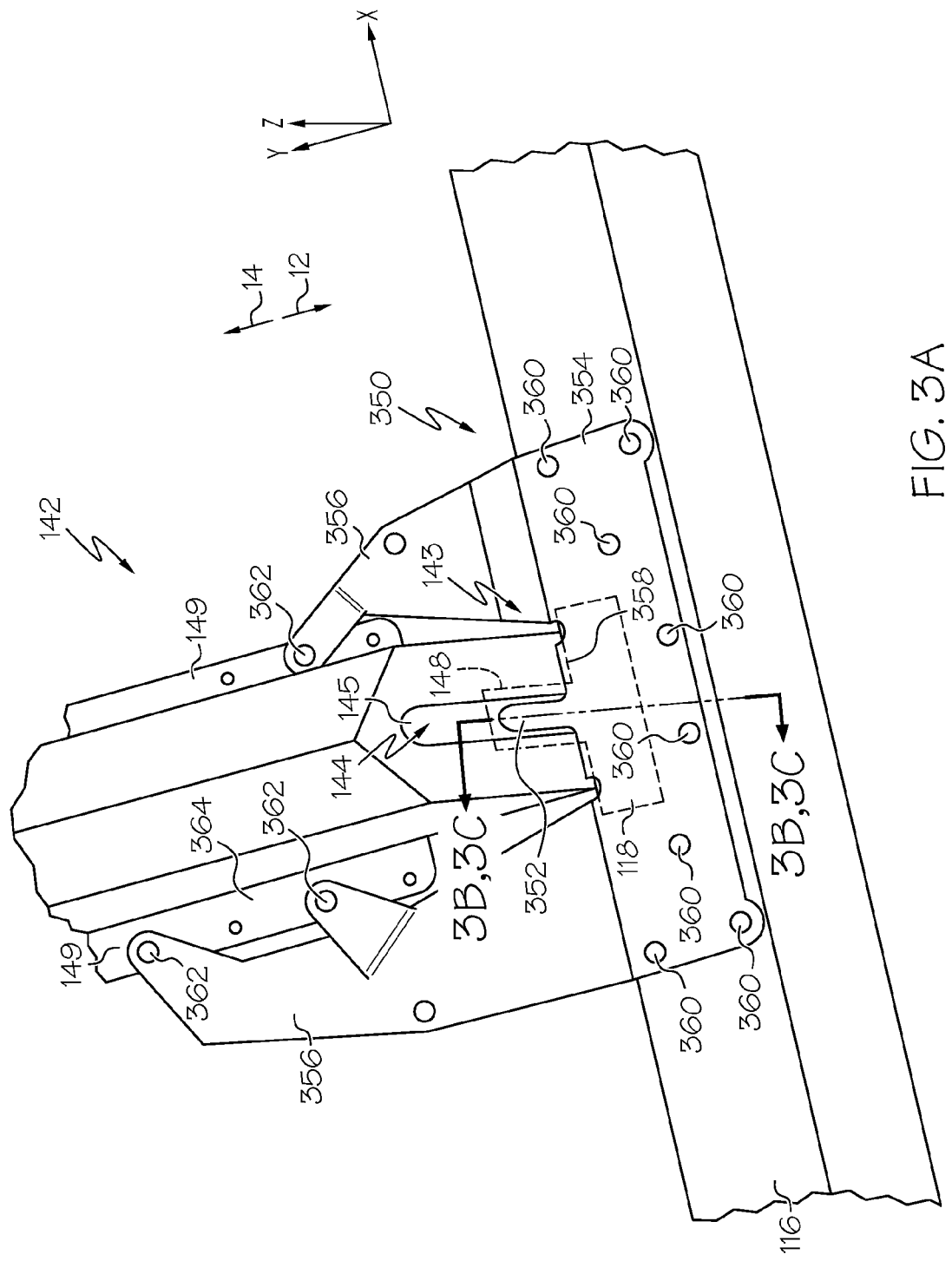
FIG. 3A schematically depicts a perspective view of vehicle structural members having a reinforcement gusset that couples a side support to a cross member according to one or more of the embodiments shown or described herein.

Referring now to FIGS. 3A-3E, a vehicle 100 that incorporates another embodiment of the reinforcement gusset 350 is depicted. The vehicle 100 includes a cross member 142, which is positioned proximate to the side support 116 at a securement interface 118. As depicted in FIG. 3A, the reinforcement gusset 350 includes a web portion 354 and a plurality of fingers 356 that extend from the web portion 354. The plurality of fingers 356 of the reinforcement gusset 350 are coupled to the cross member 142.

The cross member 142 may include a recessed portion 144. The recessed portion 144 extends inboard into the cross member. In embodiments of the vehicle structure according to the present disclosure, the recessed portion 144 may include a depression 145 that extends inboard into the cross member 142. In another embodiment, the cross member 142 may include an extended portion (not depicted) that extends outboard from the cross member 142.

Figure 3C:
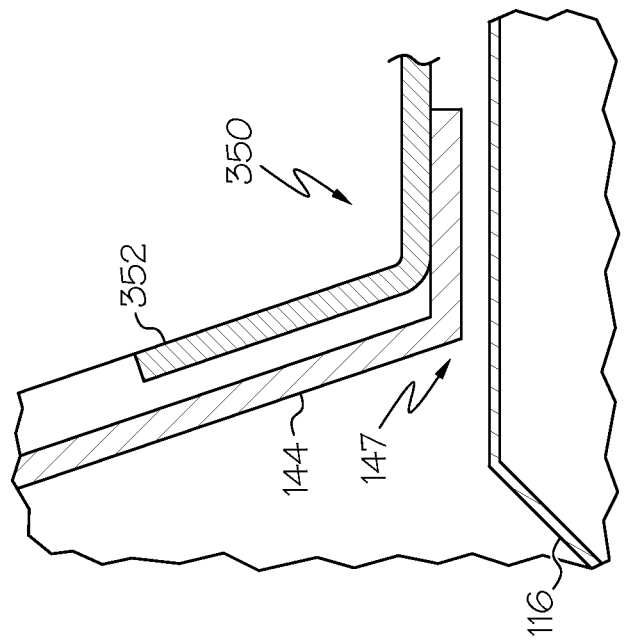
FIG. 3C schematically depicts a sectional view of vehicle structural members having a reinforcement gusset that couples a side support to a cross member along section 3C-3C depicted in FIG. 3A according to one or more of the embodiments shown or described herein.
Figure 3B:
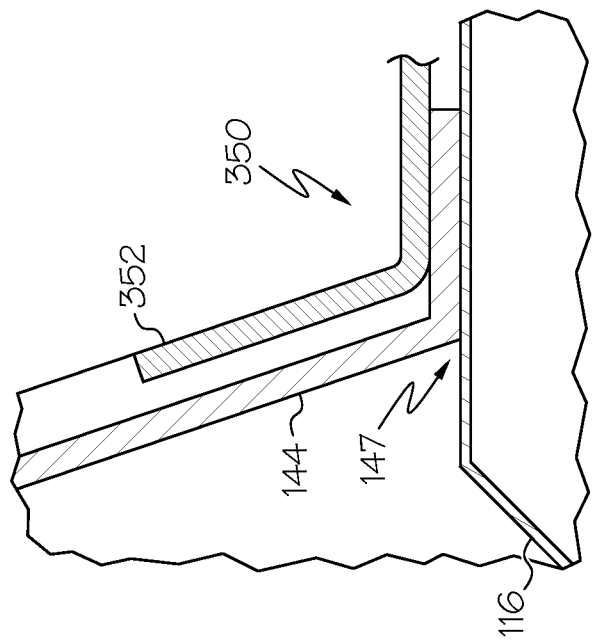
FIG. 3B schematically depicts a sectional view of vehicle structural members having a reinforcement gusset that couples a side support to a cross member along section 3B-3B depicted in FIG. 3A according to one or more of the embodiments shown or described herein.

As described above, the cross member 142 is coupled to the side support 116 at a securement interface 118 with a reinforcement gusset 350, as depicted in FIG. 3A. In some embodiments, the cross member 142 is directly coupled to the side support 116 at the securement interface 118, as depicted in FIG. 3B. In other embodiments, the cross member 142 may be detached from the side support and the cross member 142 member may be coupled to the side support 116 solely through the reinforcement gusset 350, as depicted in FIG. 3C. The cross member 142 may be coupled to the side support 116 through a variety of joining techniques including, for example and without limitation, mechanical fasteners, spot welds, weld joints, structural adhesives, brazes, shear pins, and the like.

Referring to FIGS. 3A-3E, the reinforcement gusset 350 is coupled to the cross member 142 and the proximately-located side support 116. The cross member 142 may include a flange 147 positioned between the side support 116 and the reinforcement gusset 350. In the depicted embodiment, the reinforcement gusset 350 includes a web portion 354, a plurality of fingers 356 that extend from the web portion 354 and that intersect the web portion 354 at a throat portion 358. As depicted in FIG. 3A, the reinforcement gusset 350 may be positioned proximate to the end of the cross member 142 to couple the cross member 142 and the side support 116 to one another. The reinforcement gusset 350 may be coupled to the side support 116 and the cross member 142 with a variety of joining elements, for example and without limitation, mechanical fasteners, spot welds, weld joints, structural adhesives, brazes, shear pins, and the like. The reinforcement gusset 350 may be constructed from a material similar to the materials of the cross member 142 and the side support 116. Alternatively, the reinforcement gusset 350 may be constructed from a material that differs from the cross member 142 and/or the side support 116, such that the strength of the connection between the cross member 142 and the side support 116 may be tuned.

In the depicted embodiment, the reinforcement gusset 350 is positioned proximate to the cross member 142 and the side support 116 such that the web portion 354 is coupled to the side support 116. The web portion 354 may be coupled to the side support at a plurality of outboard securement positions 360. At least one of the plurality of outboard securement positions 360 is positioned outboard of the securement interface 118 that is formed between the cross member 142 and the side support 116. In some embodiments, all of the outboard securement positions 360 are positioned outboard of the securement interface 118.

The reinforcement gusset 350 is also positioned such that the plurality of fingers 356 that extend away from the web portion 354 are positioned proximate to the cross member 142. Further, the reinforcement gusset 350 may be positioned such that the throat portion 358 is positioned inboard of the securement interface 118 between the cross member 142 and the side support 116. The plurality of fingers 356 may be coupled to the cross member 142 to couple the cross member 142 to the side support 116. As depicted in FIG. 3A, the plurality of fingers 356 may be coupled to flanges 149 of the cross member 142 that are positioned in the vehicle forward and vehicle aft directions from the box-like structure of the cross member 142. The plurality of fingers 356 may be coupled to the cross member 142 at a plurality of inboard securement positions 362. The plurality of fingers 356 may also be detached from the cross member 142 at a location 364 positioned between at least one of the plurality of inboard securement positions 362 and the outboard securement positions 360.

Because the reinforcement gusset 350 is coupled to the cross member 142 at the plurality of inboard securement positions 362, is coupled to the side support 116 at a plurality of outboard securement positions 360, and is detached from the cross member 142 and the side support 116 at positions between the inboard securement positions 362 and the outboard securement positions 360, attachment of the reinforcement gusset 350 defines an envelope of the interrupted interface 148 at positions between the inboard securement positions 362 and the outboard securement positions 360. The reinforcement gusset 350 and the cross member 142 may be positioned proximate to one another at positions within the envelope of the interrupted interface 148. However, the reinforcement gusset 350 may be detached from the cross member 142 and the side support 116.

In embodiments according to the present disclosure, the reinforcement gusset 350 may further include an extended portion 352 that is positioned proximate to the interrupted interface 148. The extended portion 352 has a shape that is complementary to the recessed portion 144 of the cross member 142 such that the shape of the extended portion 352 of the reinforcement gusset 350 generally corresponds to the shape of the recessed portion 144 of the cross member 142. The extended portion 352 may be spaced apart from or detached from the recessed portion 144, as shown in FIG. 3B. In another embodiment (not shown), the reinforcement gusset may include a recessed portion that extends outboard from the cross member 142. The cross member 142 may include an extended portion that has a shape that is complementary to the recessed portion of the reinforcement gusset such that the shape of the extended portion of the cross member generally corresponds to the shape of the recessed portion of the reinforcement gusset. As used herein, "complementary" refers to two objects that are shaped to interface with one another. In general, objects according to the present disclosure that are complementary to one another may come into contact with one another such that surfaces of a first object are in direct and intimate contact with surfaces of a second object.

Figure 3D:
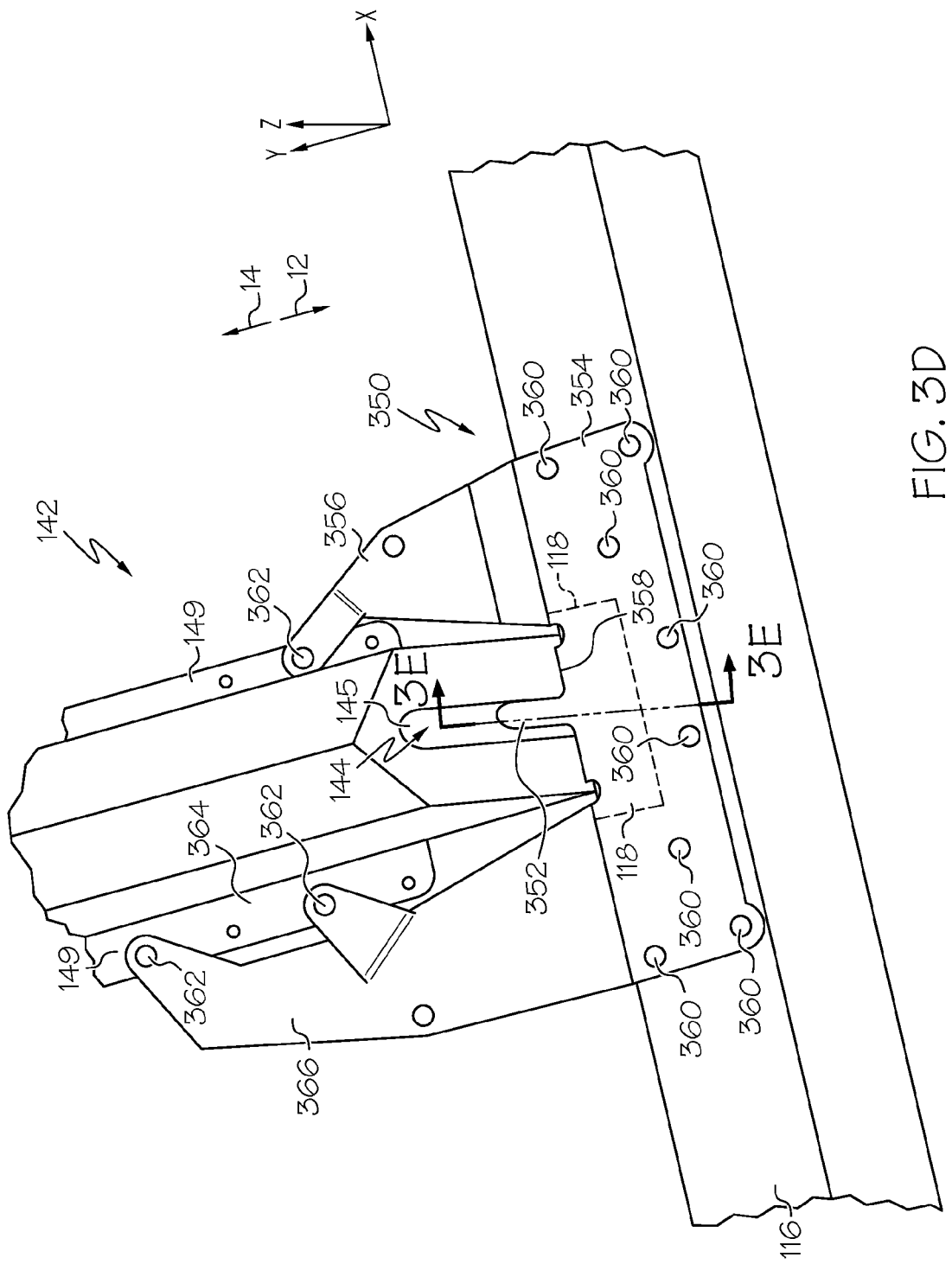
FIG. 3D schematically depicts a perspective view of vehicle structural members having a reinforcement gusset that couples a side support to a cross member with the vehicle structural members under deformation according to one or more of the embodiments shown or described herein.
Figure 3E:
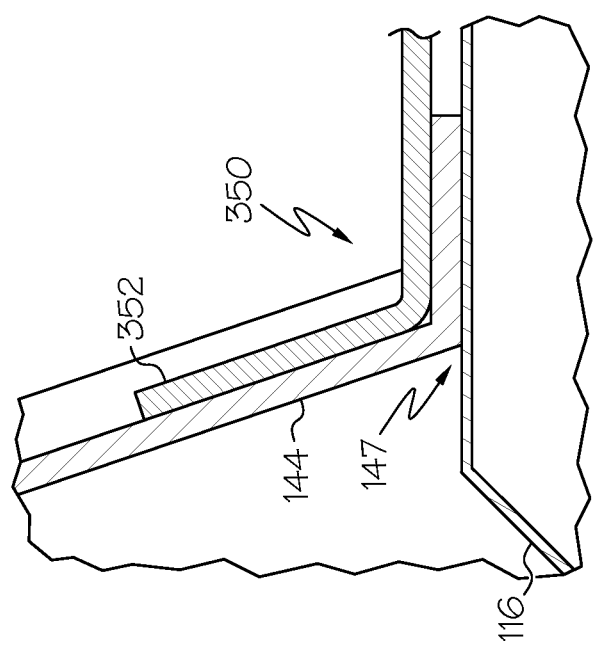
FIG. 3E schematically depicts a sectional view of vehicle structural members having a reinforcement gusset that couples a side support to a cross member with the vehicle structural members under deformation along section 3E-3E depicted in FIG. 3D according to one or more of the embodiments shown or described herein.

Referring to FIGS. 3D and 3E, and similar to the embodiment described with respect to FIG. 2, during a small front bumper overlap collision, the side support 116 may deform and translate relative to the cross member 142. Deformation and relative translation of the side support 116 relative to the cross member 142 may cause the extended portion 352 of the reinforcement gusset 350 to engage the recessed portion 144 of the cross member 142. The engagement of the extended portion 352 and the recessed portion 144 creates a mechanical interference between the cross member 142 and the reinforcement gusset 350, and therefore between the cross member 142 and the side support. In the event of a small front bumper overlap collision, the mechanical interface between the cross member 142 and the reinforcement gusset 350 may prevent the cross member 142 from separating from the side support 116. Further, the mechanical interface between the cross member 142 and the reinforcement gusset 350 may create a high-strength joint between the cross member 142 and the side support 116.

The plurality of fingers 356 that extend inboard from the web portion 354 of the reinforcement gusset 350 allow the reinforcement gusset 350 to couple the cross member 142 to the side support 116 at positions inboard from the securement interface 118. By coupling the cross member 142 to the side support 116 with the fingers 356 that extend inboard of the securement interface 118, the reinforcement gusset 350 may distribute energy from a small front bumper overlap collision from the side support 116 to the cross member 142 at positions inboard of the securement interface 118. The reinforcement gusset 350, therefore, may assist in preventing the cross member 142 from separating from the side support 116 during a small front bumper overlap collision.

Similarly, by coupling the web portion 354 of the reinforcement gusset 350 at positions outboard from the securement interface 118, the reinforcement gusset 350 may assist in distributing energy from a small front bumper overlap collision from the side support into the cross member 142. The reinforcement gusset 350 according to the present disclosure, therefore, may assist in preventing the cross member 142 from separating from the side support 116.

Because the reinforcement gusset 350 is coupled to the side support 116 at positions outside of the securement interface 118 and the reinforcement gusset 350 is coupled to the cross member 142 at positions inside of the securement interface 118, the spacing between the inboard securement positions 362 and the outboard securement positions 360 may increase an effective length of the moment arm through which the reinforcement gusset 350 can react forces and direct energy associated with a small front bumper overlap collision. Accordingly, the energy transferred from the side support 116 to the cross member 142 through the reinforcement gusset 350 may be enhanced.

Figure 4A:
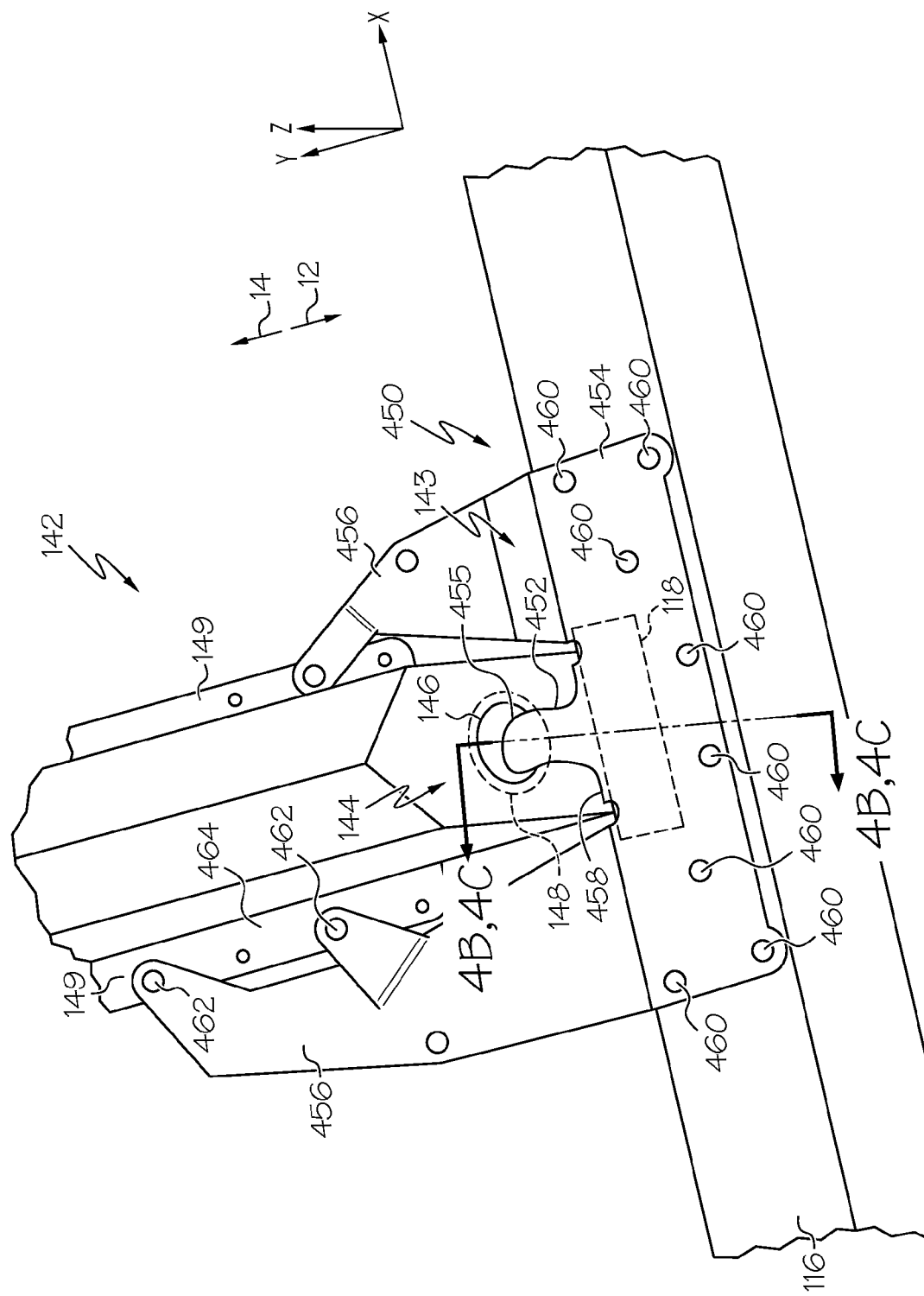
FIG. 4A schematically depicts a perspective view of vehicle structural members having a reinforcement gusset that couples a side support to a cross member according to one or more of the embodiments shown or described herein.
Figure 4C:
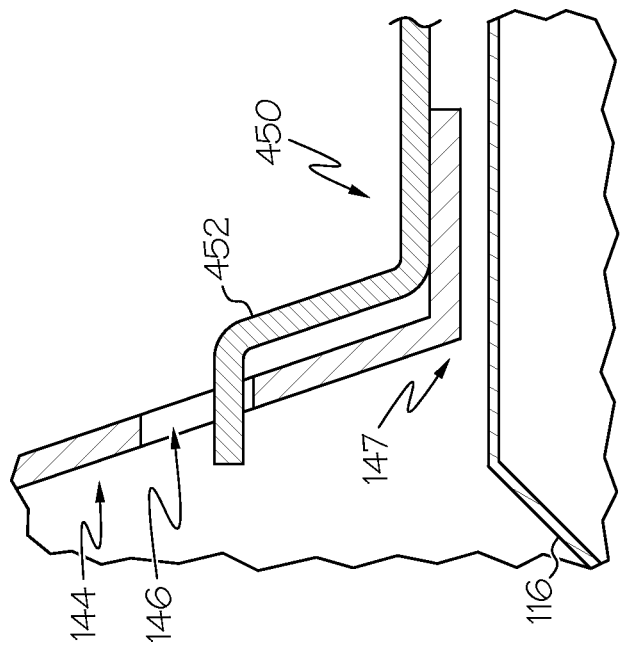
FIG. 4C schematically depicts a sectional view of vehicle structural members having a reinforcement gusset that couples a side support to a cross member along section 4C-4C depicted in FIG. 4A according to one or more of the embodiments shown or described herein.
Figure 4B:
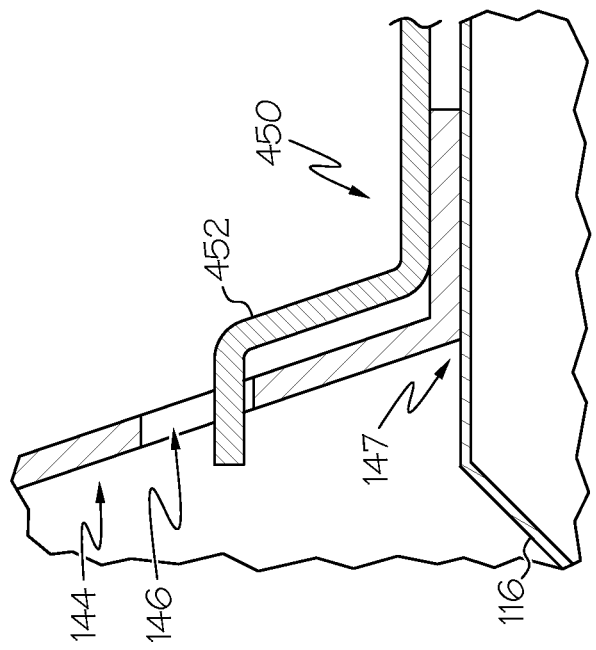
FIG. 4B schematically depicts a sectional view of vehicle structural members having a reinforcement gusset that couples a side support to a cross member along section 4B-4B depicted in FIG. 4A according to one or more of the embodiments shown or described herein.

Referring now to FIGS. 4A-4E, another embodiment of the reinforcement gusset 450 is depicted. In this embodiment, the cross member 142 is positioned proximate to the side support 116 at a securement interface 118. In this embodiment, the recessed portion 144 of the cross member 142 includes a keyway 146. The cross member 142 may be directly coupled to the side support 116 at the securement interface 118, as depicted in FIG. 4B. In some embodiments, the cross member 142 may be detached from the side support 116 at the securement interface 118, as depicted in FIG. 4C. Instead, the cross member 142 may be coupled to the side support 116 solely through a reinforcement gusset 450. In other embodiments (not shown), the cross member 142 may be partially coupled to the side support 116 with a joining element, for example and without limitation, mechanical fasteners, spot welds, weld joints, structural adhesives, brazes, shear pins, and the like.

Referring to FIGS. 4A-4C, the reinforcement gusset 450 may be coupled to the cross member 142 and at least one of the side supports 116. The cross member 142 may include a flange 147 positioned between the side support 116 and the reinforcement gusset 450. The reinforcement gusset 450 may include a web portion 454 that is coupled to the side support 116. The web portion 454 may be coupled to the side support at a plurality of securement positions 460. At least one of the plurality of securement positions 460 may be positioned outboard of the securement interface 118 between the cross member 142 and the side support 116.

The plurality of fingers 456 that extend inboard from the web portion 454 of the reinforcement gusset 450 allow the reinforcement gusset 450 to couple the cross member 142 to the side support 116 at positions inboard from the securement interface 118.

By coupling the cross member 142 to the side support 116 with the fingers 456 that extend inboard of the securement interface 118, the reinforcement gusset 450 may distribute energy from a small front bumper overlap collision from the side support 116 to the cross member 142 at positions inboard of the securement interface 118. The reinforcement gusset 450, therefore, may assist in preventing the cross member 142 from separating from the side support 116 during a small front bumper overlap collision.

Similarly, by coupling the web portion 454 of the reinforcement gusset 450 at positions outboard from the securement interface 118, the reinforcement gusset 450 may assist in distributing energy from a small front bumper overlap collision from the side support into the cross member 142. The reinforcement gusset 450 according to the present disclosure, therefore, may assist in preventing the cross member 142 from separating from the side support 116.

Because the reinforcement gusset 450 is coupled to the side support 116 at positions outboard of the securement interface 118 and the reinforcement gusset 450 is coupled to the cross member 142 at positions inboard of the securement interface 118, the spacing between the inboard securement positions 362 and the outboard securement positions 360 may increase an effective length of the moment arm through which the reinforcement gusset 350 can react forces and direct energy associated with a small front bumper overlap collision. Accordingly, the energy transferred from the side support 116 to the cross member 142 through the reinforcement gusset 450 may be enhanced.

Referring to FIGS. 4A, 4B and 4C, the reinforcement gusset 450 is positioned proximate to the cross member 142, such that the reinforcement gusset 450 and the cross member 142 define an interrupted interface 148. At the interrupted interface 148, the reinforcement gusset 450 and the cross member 142 are proximate to one another, however, the reinforcement gusset and the cross member 142 are detached from one another under ordinary vehicle operating conditions.

The reinforcement gusset 450 is also positioned such that the plurality of fingers 456 that extend away from the web portion 454 are positioned proximate to the cross member 142. Further, the reinforcement gusset 450 may be positioned such that the throat portion 458 is positioned inboard of the securement interface 118 between the cross member 142 and the side support 116. The plurality of fingers 456 may be coupled to the cross member 142 to couple the cross member 142 to the side support 116. As depicted in FIG. 4A, the plurality of fingers 456 may be coupled to flanges 149 of the cross member 142 that are positioned in the vehicle forward and vehicle aft directions from the box-like structure of the cross member 142. The plurality of fingers 456 may be coupled to the cross member 142 at a plurality of inboard securement positions 462. The plurality of fingers 456 may also be detached from the cross member 142 at a location 464 positioned between at least one of the plurality of inboard securement positions 462 and the outboard securement positions 460.

Because the reinforcement gusset 450 is coupled to the cross member 142 at the plurality of inboard securement positions 462, is coupled to the side support 116 at a plurality of outboard securement positions 464, and is detached from the cross member 142 and the side support 116 at positions between the inboard securement positions 462 and the outboard securement positions 464, attachment of the reinforcement gusset 450 defines an envelope of the interrupted interface 148 at positions between the inboard securement positions 462 and the outboard securement positions 464. The reinforcement gusset 450 and the cross member 142 may be positioned proximate to one another at positions within the envelope of the interrupted interface 148. However, the reinforcement gusset 450 may be detached from the cross member 142 and the side support 116.

Referring to FIGS. 4A-4C, the reinforcement gusset 450 may include an extended portion 452 positioned proximate to the interrupted interface 148, as described above with respect to FIGS. 2A-2E. The extended portion 452 has a shape that is complementary to the recessed portion 144 of the cross member 142. In the embodiment depicted in FIGS. 4A-4C, the extended portion 452 includes a keyed portion 455 that has a shape that generally corresponds to, and may be positioned within the keyway 146 of the recessed portion 144. The extended portion 452 may be positioned within the keyway 146 so that the extended portion 452 is spaced apart and detached from the keyway 146 of the recessed portion 144.

Referring to FIGS. 4D and 4E, when the vehicle undergoes a small front bumper overlap collision, the side support 116 may be deflected and/or deformed relative to the cross member 142 such that the keyed portion 455 of the extended portion 452 of the reinforcement gusset 450 may be repositioned to come into contact with the keyway 146 of the cross member 142. The engagement between the extended portion 452 of the reinforcement gusset 450 and the keyway 146 of the cross member 142 may provide a mechanical interference between the reinforcement gusset 450 and the cross member 142. The mechanical interference between the reinforcement gusset 450 and the cross member 142 may allow for energy to be transferred from the side support 116 into the cross member 142. The mechanical interface may additionally provide some relative freedom of movement between the side support 116 and the cross member 142. By providing the side support 116 and the cross member 142 some relative freedom of movement, the reinforcement gusset 450 may assist in preventing the cross member 142 from separating from the side support 116 as the side support 116 deforms and/or translates following a collision.

By providing the side support 116 and the cross member 142 with a mechanical interface that is selectively brought into engagement following a small front bumper overlap collision, the mechanical interface may provide a resilient connection between the side support 116 and the cross member 142 when it is desired to transfer energy into the cross member 142. By introducing a mechanical interface according to the present disclosure into the vehicle structure, the side support 116 and the cross member 142 may have some flexibility of translation relative to one another. Such flexibility of translation may allow the side support 116 and the cross member 142 to translate relative to one another. Allowing the side support 116 and the cross member 142 to translate relative to one another may reduce certain loads from being imparted to the connection between the side support 116 and the cross member 142. For example, by providing the mechanical interface between the side support 116 and the cross member 142 with some flexibility, shear loads introduced into the mechanical interface may be accommodated across the mechanical interface. Because of the increased flexibility of the mechanical interface, reaction of shear loads through the mechanical interface may be reduced, thereby increasing the ability of the mechanical interface to transfer energy from the side support 116 to the cross member 142 when the vehicle undergoes a small front bumper overlap collision.

It should now be understood that vehicle according to the present disclosure may include a reinforcement gusset that is coupled to a side support and a cross member. The cross member and the reinforcement gusset define an interrupted interface in which one of the reinforcement gusset or the cross member include a recessed portion and the opposite of the reinforcement gusset or the cross member include an extended portion. The recessed portion and the extended portion may have complementary shapes and are positioned such that when the vehicle is subjected to a small front bumper overlap collision, the recessed portion and the extended portion come into contact with one another, thereby allowing energy associated with the collision to transfer from the side support to the cross member. The recessed portion and the extended portion may provide enhanced flexibility to the mechanical interface between the side support and the cross member to reduce certain forces from developing in the mechanical interface.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a front suspension unit;
   a side support extending in a vehicle longitudinal direction and positioned rearward of the front suspension unit in the vehicle longitudinal direction;
   a cross member extending transverse to the side support; and
   a reinforcement gusset coupled to the side support and the cross member, wherein the cross member and the reinforcement gusset define an interrupted interface in which one of the cross member or the reinforcement gusset comprises a recessed portion and the opposite of the cross member or the reinforcement gusset comprises an extended portion, and the recessed portion and the extended portion have complementary shapes and are detached from one another.

2. The vehicle of claim 1, wherein the reinforcement gusset comprises the extended portion and the cross member comprises the recessed portion.

3. The vehicle of claim 1, wherein the reinforcement gusset comprises a web portion that is coupled to the side support, a plurality of fingers that extend from the web portion and are coupled to the cross member, and a throat portion positioned where the fingers intersect the web portion.

4. The vehicle of claim 3, wherein at least one of the plurality of fingers is coupled to the cross member at a plurality of securement positions.

5. The vehicle of claim 4, wherein the at least one of the plurality of fingers is detached from the cross member at a location between an inboard securement position and an outboard securement position.

6. The vehicle of claim 1, wherein the recessed portion comprises a depression into one of the reinforcement gusset or the cross member.

7. The vehicle of claim 1, wherein the recessed portion comprises a keyway on one of the reinforcement gusset or the cross member.

8. The vehicle of claim 1, wherein the cross member comprises a flange positioned between the side support and the reinforcement gusset.

9. A vehicle comprising:
   a side support extending in a vehicle longitudinal direction;
   a cross member extending transverse to the side support and positioned proximate to the side support at a securement interface; and
   a reinforcement gusset coupled to the side support and the cross member, wherein:
      the reinforcement gusset is coupled to the side support at an outboard securement position in a vehicle lateral direction from the securement interface;
      the reinforcement gusset is coupled to the cross member at an inboard securement position in the vehicle lateral direction from the securement interface; and
      the reinforcement gusset comprises a web portion that is coupled to the side support, a plurality of fingers that extend from the web portion and are coupled to the cross member, and a throat portion positioned where the fingers intersect the web portion.

10. The vehicle of claim 9, wherein:
    the throat portion is positioned in an inboard direction in the vehicle lateral direction from the securement interface; and
    the web portion is detached from the side support at positions between the inboard securement position and the throat portion.

11. The vehicle of claim 9, wherein at least one of the plurality of fingers is coupled to the cross member at a plurality of securement positions.

12. The vehicle of claim 11, wherein the at least one of the plurality of fingers is detached from the cross member at a location between a plurality of inboard securement positions and a plurality of outboard securement positions.

13. The vehicle of claim 9, wherein the cross member and the reinforcement gusset define an interrupted interface within the securement interface in which one of the cross member or the reinforcement gusset comprises a recessed portion and the opposite of the cross member or the reinforcement gusset comprises an extended portion, and the recessed portion and the extended portion have complementary shapes and are detached from one another.

14. The vehicle of claim 13, further comprising a front suspension unit comprising a tire, wherein the side support is positioned rearward of the tire in the vehicle longitudinal direction.

15. The vehicle of claim 13, wherein the reinforcement gusset comprises the extended portion and the cross member comprises the recessed portion.

16. The vehicle of claim 13, wherein the recessed portion comprises a depression into one of the reinforcement gusset or the cross member.

17. The vehicle of claim 13, wherein the recessed portion comprises a keyway on one of the reinforcement gusset or the cross member.

18. The vehicle of claim 9, wherein the cross member comprises a pair of flanges, and wherein the plurality of fingers of the reinforcement gusset are coupled to the flanges.

19. A method of resisting separation of a cross member and a side support during a vehicle collision, the method comprising:
   striking a front of a vehicle against an object;
   translating a front suspension unit of the vehicle in a rearward vehicle longitudinal direction;
   striking the front suspension unit against the side support of the vehicle;
   translating the side support of the vehicle in the rearward vehicle longitudinal direction; and
   resisting separation of the cross member from the side support with a reinforcement gusset coupled to the side support and the cross member, wherein the cross member and the reinforcement gusset define an interrupted interface in which one of the cross member or the reinforcement gusset comprises a recessed portion and the opposite of the cross member or the reinforcement gusset comprises an extended portion, and the recessed portion and the extended portion have complementary shapes and are detached from one another.

20. The method of claim 19, wherein the reinforcement gusset comprises the extended portion and the cross member comprises the recessed portion.

* * * * *